Dec. 31, 1935.  R. A. CHRISTIAN  2,026,020
CARRIAGE FOR ACCOUNTING MACHINES
Filed Jan. 2, 1932  6 Sheets-Sheet 1

Inventor
Raymond A. Christian
By Carl Beust
His Attorney

Dec. 31, 1935.   R. A. CHRISTIAN   2,026,020
CARRIAGE FOR ACCOUNTING MACHINES
Filed Jan. 2, 1932   6 Sheets-Sheet 3

Inventor
Raymond A. Christian
By
His Attorney

Dec. 31, 1935.   R. A. CHRISTIAN   2,026,020
CARRIAGE FOR ACCOUNTING MACHINES
Filed Jan. 2, 1932   6 Sheets-Sheet 4

Inventor
Raymond A. Christian
By
Earl Benst
His Attorney

Dec. 31, 1935.   R. A. CHRISTIAN   2,026,020
CARRIAGE FOR ACCOUNTING MACHINES
Filed Jan. 2, 1932   6 Sheets-Sheet 5

Inventor
Raymond A. Christian
By
Earl Beust
His Attorney

Dec. 31, 1935.  R. A. CHRISTIAN  2,026,020

CARRIAGE FOR ACCOUNTING MACHINES

Filed Jan. 2, 1932  6 Sheets-Sheet 6

Inventor
Raymond A. Christian
By *Pearl Benot*
His Attorney

Patented Dec. 31, 1935

2,026,020

UNITED STATES PATENT OFFICE 2,026,020

CARRIAGE FOR ACCOUNTING MACHINES

Raymond A. Christian, Dayton, Ohio, assignor to The National Cash Register Company, Dayton, Ohio, a corporation of Maryland Application January 2, 1932, Serial No. 584,438

16 Claims. (Cl. 197—135)

This invention relates to accounting or bookkeeping machines and the like, but more particularly to machines of this type having a traveling carriage, such as are set out and described in Letters Patent of the United States, Nos. 1,197,276 and 1,197,278 issued September 5, 1916 to Halcolm Ellis, and Patent No. 1,203,863 issued November 7, 1916 to Halcolm Ellis.

One of the objects of this invention is to provide a card receptacle or chute for use on the traveling carriage of the type of machine referred to in the above mentioned patents.

Another object is to provide the card receptacle with a novel adjustable stop mechanism to assist in properly locating the cards in the chute.

Another object is to provide the card chute with means for securing the cards placed therein.

Still another object is to provide the securing means with automatic and manual releasing means.

A further object is to provide the traveling carriage with a novel slip receptacle or chute which may be used in conjunction with the card chute or alone, as desired.

Another object is to supply tally roll mechanism with unique features for use on the traveling carriage, either in conjunction with the card chute or alone.

A still further object is to provide means for locking the machine releasing mechanism when the traveling carriage is being tabulated manually.

Another object is to provide convenient storage means to be used in conjunction with the card chute, for holding cards to be printed upon and for receiving cards which have been printed upon by the machine.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings:

F'g. 3 is a perspective view of the preferred form of card receptacle or chute.

Fig. 4 is a view of the right end of the card chute.

F g. 5 is a sectional view of the card chute taken along line 5—5 of Fig. 3, as viewed from the right.

Fig. 6 is a sectional view of the card chute looking toward the left and taken along line 6—6 of Fig. 3.

GENERAL DESCRIPTION

The present invention is incorporated in a machine of the well known Ellis type, having a traveling carriage. This invention in the preferred form consists of a card receptacle and a slip receptacle mounted upon the traveling carriage in such a way that material placed therein is interposed between the printing type and platen roll. The card chute has an adjustable stop which may be locked in any one of several positions. There is also means for retaining the cards in proper location when placed in the card chute. When the traveling carriage is in predetermined positions this card retaining mechanism becomes effective at the beginning of a machine operation, and remains thus until near the end of said operation. Attached to the card chute is a plurality of receptacles for holding cards to be acted upon by the machine and to receive those cards which have been acted upon.

The slip chute has a plurality of compression rolls which hold the slips inserted therein securely against the platen roll, so that said slips will be automatically fed by said platen roll.

Convenient means for releasing the compression rolls is supplied for use when removing or inserting slips.

A tally roll mechanism has been devised for the traveling carriage, which may be used alone or in conjunction with either the card chute or slip chute. The receiving roll of the tally mechanism is rotated by being geared to the platen roll of the traveling carriage. This rotating mechanism may be connected or disconnected at will.

A modified form of card chute is also shown, which employs a different method of adjusting the card stops than that of the preferred form. However, the method of securing the cards inserted therein is similar to that employed in the preferred form. In the description to follow, the above mechanims will be treated in detail.

DETAIL DESCRIPTION

*Adjustable card receptacle or chute*

Figures 1, 2:
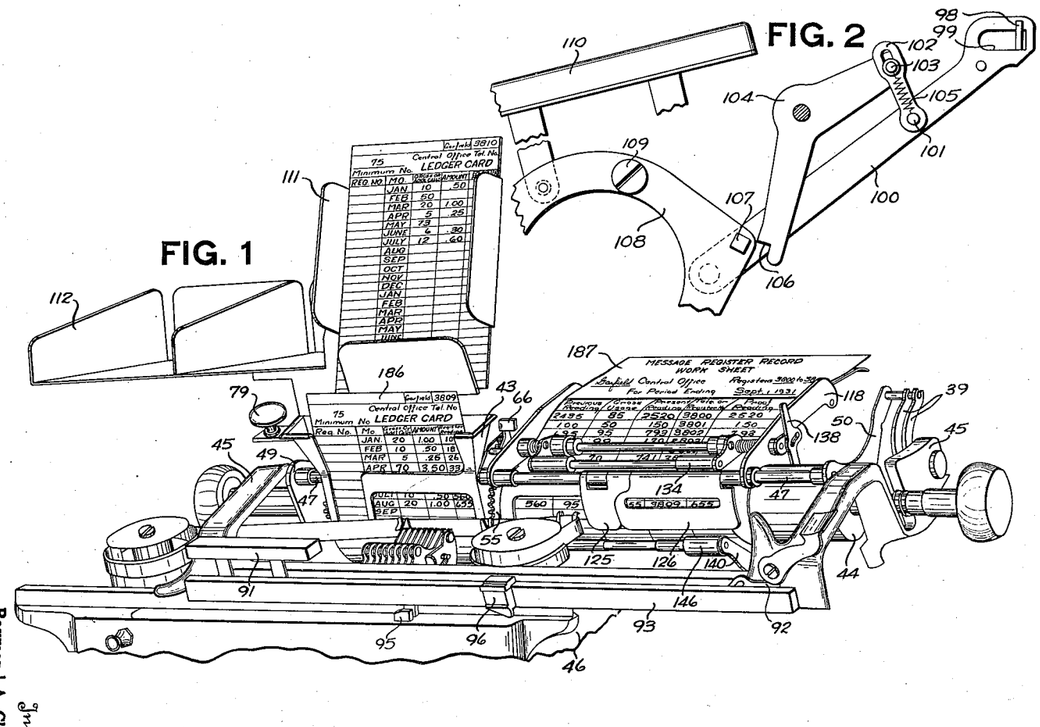
Fig. 1 is a view in perspective showing in reduced scale the traveling carriage of an accounting machine with the card receptacle and slip receptacle mounted thereon.
Fig. 2 is a detail of mechanism for locking the machine against release during manual tabulation of the traveling carriage.
Figures 3, 4, 5, 6:
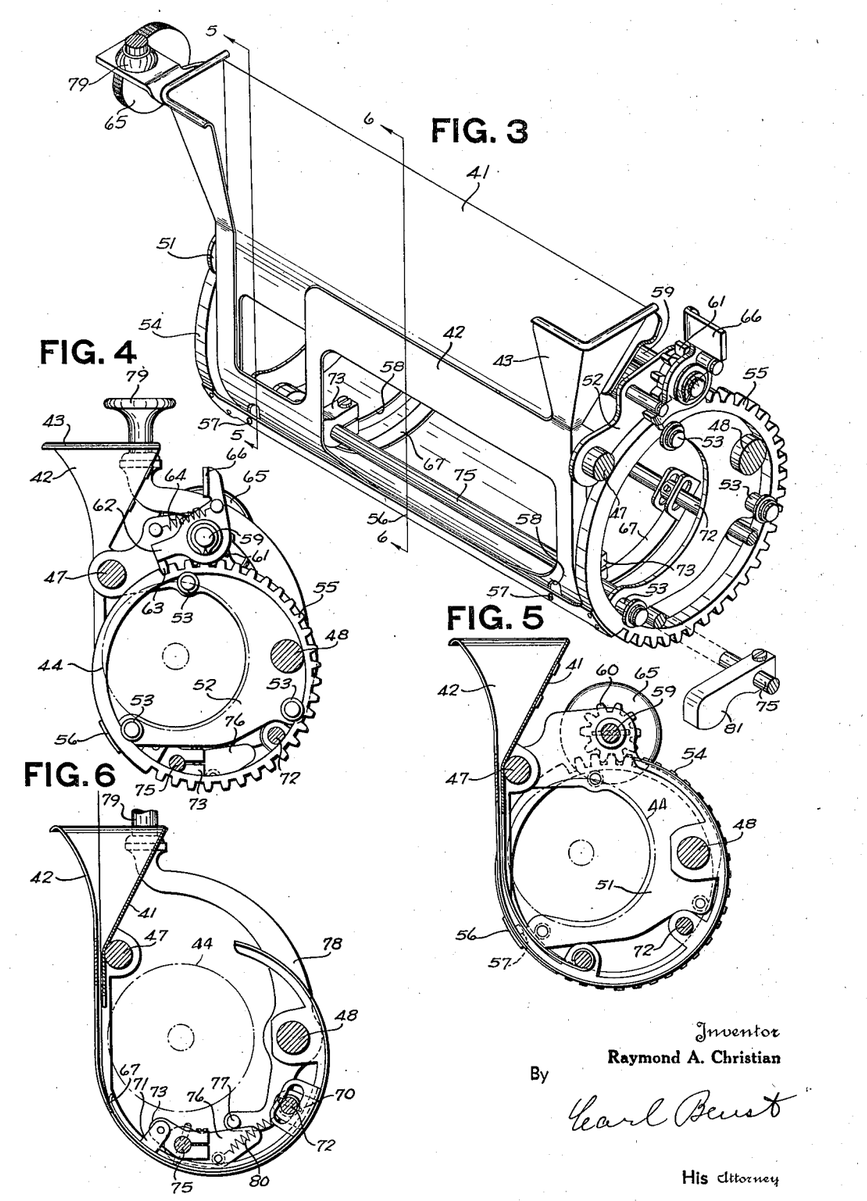

Referring to Figs. 1 and 3, a pair of plates 41 and 42 are shaped to form a card receptacle or chute 43, which encircles a platen roll 44 journaled in arms 39 (Figs. 1 and 14), on a traveling carriage frame 45. The carriage frame 45 is slidably mounted on a machine case 46, which encloses the machine mechanism and is in turn supported by a machine base (not shown).

The card chute 43 (Fig. 3) is supported by a pair of rods 47 and 48 carried by a pair of carriage end plates 49 and 50 (Fig. 1) which are carried by the shaft of platen 44, and travel as a unit with the traveling carriage. A pair of plates 51 and 52, (Figs. 3 and 4), one at each end of the card chute 43, also supported by the rods 47 and 48, have mounted thereon a plurality of rollers 53, arranged to rotatably support a pair of ring gears 54 and 55 mounted concentric to the circular portion of the card chute 43. The ring gears 54 and 55 are connected by a horizontal cross bar 56 which lies near the outer surface of the plate 42 and carries two stop studs 57 which extend through parallel slots 58 cut in the circular portion of the plate 42. Journaled in the plates 51 and 52 is a shaft 59 which has secured thereto a pair of pinions 60 and 61 (Figs. 3 and 5), which mesh respectively with the ring gears 54 and 55. Pivoted on the right end of the shaft 59 is a locking pawl 62 (Fig. 4) having a tooth 63 which is normally held in engagement with the ring gear 55 by a spring 64. Secured to the left end of the shaft 59 is a knurled hand knob 65. Formed on the locking pawl 62 is a right-angled fingerpiece 66 which facilitates disengaging said locking pawl.

When it is desired to change the location of the stop studs 57, the operator, by means of the fingerpiece 66, disengages the locking pawl 62 from the ring gear 55 and rotates the knob 65 until the stop studs 57 are properly located. The finger-piece 66 is then released and the locking pawl 62 engages the gear 55 and retains the stop studs 57 in their newly adjusted positions.

*Card retaining means*

Means for retaining the card in place within the card chute have been provided and will now be described.

A pair of tension fingers 67 (Figs. 3 and 6) each have two symmetrical ears 70 formed thereon, which are slotted to embrace a shaft 72 supported by ears formed on the card chute plate 42. Another pair of symmetrical ears 71 (Fig. 6) carried by the fingers 67 are pivoted to a pair of adjustable arms 73 secured to a shaft 75 supported by the card chute plate 42 and the carriage end plate 50.

Secured to the shaft 75 is a tension arm 76 (Fig. 6) which is adapted to cooperate with a stud 77 in a release lever 78 pivoted on the shaft 48. The upper end of the lever 78 has a right-angled extension to which is fastened a knob 79 (Figs. 1 and 4). A spring 80 (Fig. 6) is tensioned to urge the arm 76, shaft 75, and arms 73 counter-clockwise, which in turn presses the card tension fingers 67 against the inside surface of the card chute plate 42.

When it is desired to release the clamping fingers 67 (Fig. 6) by hand, to either remove or insert a card, the operator presses downward on the knob 79, rocking the lever 78 counter-clockwise, thus causing the stud 77 to rock the arm 76, shaft 75, and arms 73 clockwise, thereby raising said fingers 67 away from the card or plate 42 as the case may be.

Figures 9, 10, 11, 12, 13:
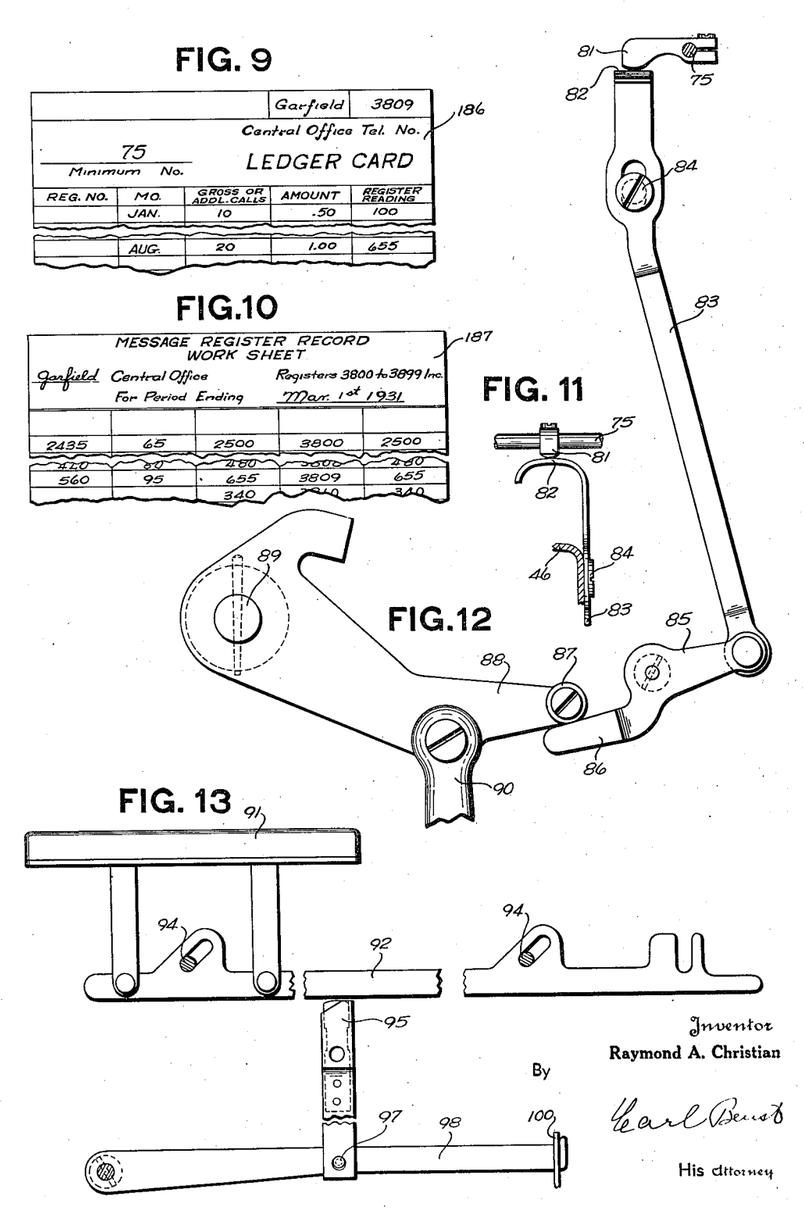
Fig. 9 is a facsimile of a portion of a "ledger card".
Fig. 10 is a facsimile of a portion of a "work sheet".
Fig. 11 is a detail view showing the manner in which the card release pitman engages the card release arm.
Fig. 12 is a full-size detail view of the automatic tension release mechanism.
Fig. 13 is a view showing in detail the manual tabulating mechanism.

It is also desirable to automatically release the fingers 67 to facilitate in the insertion and withdrawal of cards into and from the chute when the carriage is in certain tabulated positions, and to obtain this result, there is secured to the shaft 75 a plurality of release arms 81 (Figs. 3, 11 and 12), adapted to cooperate with a rounded extension 82 on a pitman 83 (Figs. 11 and 12). The arms 81 may vary in number, depending upon the system being used with the machine, and these arms 81 may be clamped to the shaft 75 in any desired positions. The pitman 83 (Fig. 12) is slotted near its upper end to embrace a shoulder screw 84 fast in the machine case 46. The lower end of the pitman 83 is pivoted to a lever 85 which is, in turn, pivoted to the machine case 46, and has an arm 86 adapted to cooperate with a roller 87 carried by a drive arm 88 secured to a main shaft 89 supported between two main machine frames (not here shown). A link 90 connects the arm 88 to the driven member of a clutch, the driving member of said clutch being geared to an electric motor, neither of which is here shown.

With the parts in the positions shown in Fig. 12, the arm 81 and shaft 75 are held so that the tension fingers 67 are away from the card chute, or a card, provided one is in the chute. Thus, a card may be readily inserted in the chute if it is empty, and on the other hand, any card in the chute may be easily removed.

During operation of the machine the arm 88 oscillates through an angle of approximately 60 degrees, the first movement being counter-clockwise. The initial movement of the arm 88 withdraws the roller 87 from the arm 86 of the lever 85 allowing the pitman 83 to move downward and the shaft 75 to rotate counter-clockwise under tension of the spring 80 (Fig. 6). This causes the fingers 67 (Fig. 3) to be firmly pressed against any card located within the chute 43.

*Tabulating release lever and starting bar locking mechanism*

Convenient means for releasing the traveling carriage for tabulation have been supplied in the machine of the present invention, and will now be described.

Referring to Figs. 1 and 13, a touch bar 91 is secured to a tabulating release bar 92 slidably mounted on a tabulating stop bar 93 by means of a plurality of diagonal slots embracing a plurality of studs 94 secured in said stop bar 93, which is in turn secured to the traveling carriage frame 45. The lower edge of the release bar 92 is adapted to cooperate with a tabulating plunger 95 mounted to slide vertically in a tabulating frame (not shown). The upper end of the plunger 95 is adapted to cooperate with a plurality of stops 96, only one here shown, (Fig. 1), to enable the traveling carriage to be moved step by step from right to left. The plunger 95 (Fig. 13) has a hole to receive a stud 97 carried by a plunger lever 98 pivoted to the tabulating frame. The right end of the lever 98 is arranged to cooperate with a slot 99 in an automatic tabulating lever 100 (Figs. 2 and 13) which is pivoted to the right machine frame (not shown).

Pivoted to a stud 101 in the lever 100 (Fig. 2) is a link 102 having a slot through which extends a stud 103 in a locking lever 104 pivoted to the right machine frame (not shown). A spring 105 is stretched between the studs 101 and 103 to form a flexible connection between the levers 100 and 104. The lever 104 has a notch 106 adapted to cooperate with a square stud 107 in a starting lever 108 pivoted at 109 to the right machine frame (not shown). One leg of a starting bar 110 is pivoted to the lever 108 so that depression of the starting bar 110 rocks the lever 108 counter-clockwise to release the machine for operation in the well known manner.

Depression of the touch bar 91 (Figs. 2 and 13) moves the plunger 95 downward out of the path of the tabulating stops 96, which allows the traveling carriage to be moved freely in either direction. The downward movement of the plunger 95 rocks the levers 98, 100 and 104 clockwise, causing the notch 106 to move into the path of the stud 107 to prevent depression of the starting bar 110 as long as the touch bar 91 remains depressed.

Release of the machine for operation causes the stud 107 (Fig. 2) to move upwardly to a position above the notch 106, thus blocking any movement of the lever 104. However, due to the slot in the link 102, the automatic tabulating lever 100 is permitted to function. The description, operation, and also illustration of automatic tabulation may be found in a patent to F. W. Bernau, No. 1,731,701, dated October 15, 1929.

The slot in the link 102 also prevents any binding or injury to the parts, should the operator depress the touch bar 91 after the machine has been released by depression of the motor bar 110.

Card storage means

Card storage means have been provided for holding cards in convenient relationship to the card chute. Such card holders will now be briefly described. Referring to Fig. 1, attached to the machine case 46 are card holders 111 and 112. The card holder 111 is arranged to hold cards preparatory to being run through the machine, and the holder 112 is arranged to receive those which have been acted upon by the machine. The card holders shown are for a particular system. The size and shape of the card holders as well as the number may be varied to meet the needs of the system at hand.

Slip receptacle or chute

The traveling carriage of the instant machine is equipped with a slip receptacle or chute 118 (Figs. 1 and 7) which, as previously stated, may be used alone or in conjunction with the card chute 43. A detailed description of the slip chute will now be given.

Figure 7:
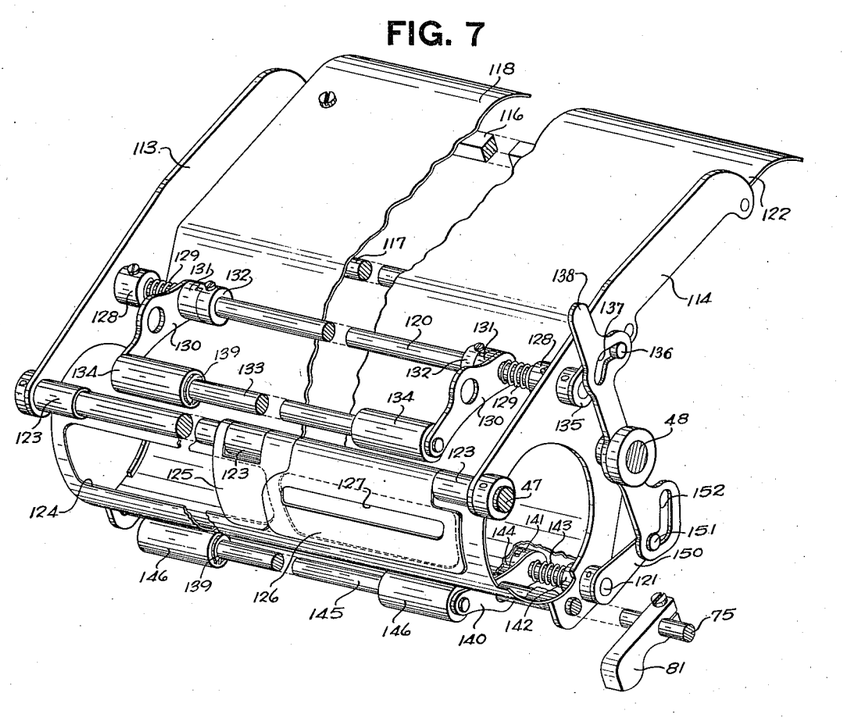
Fig. 7 is a view in perspective of the slip receptacle or chute.
Figure 8:
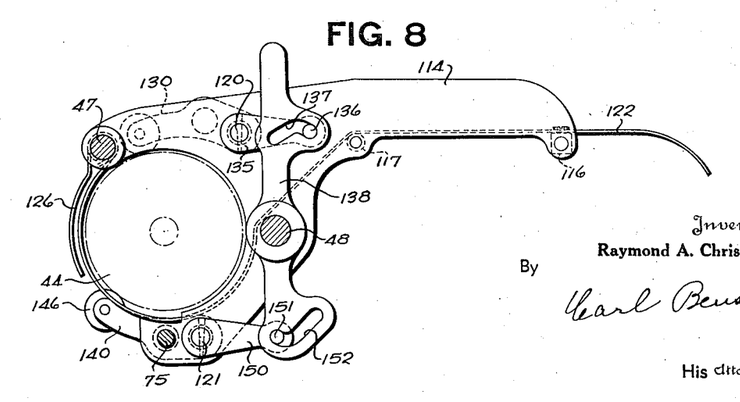
Fig. 8 is an end view of the slip chute as observed from the right.

Fig. 1 well shows the location of the card and slip chutes upon the traveling carriage and their positions in relation to each other, while Figs. 7 and 8 illustrate in detail the construction of the slip chute.

Referring to Fig. 7, the slip chute 118 includes a pair of end plates 113 and 114 supported by the rods 47 and 48. Rods 116 and 117 and two shafts 120 and 121 extend the width of the slip chute and connect the plates 113 and 114. A guide plate 122 (Figs. 7 and 8) is secured to the rod 116 and is supported by the rods 117 and 48. The guide plate 122 is formed around the platen roll 44; ample clearance being allowed between the guide plate and platen roll for the insertion of slips therebetween. The guide plate 122 is supported at its front end by projections 123 thereon bent around the rod 47. The guide plate 122 has therein a plurality of openings 124 through which the printing type makes contact with the slip.

Hinged to the rod 47 and straddling one of the projections 123 is a cover 125 (Fig. 7) which may be used to hide from view matter printed in one of the columns on the slip. Also hinged on the rod 47 between the cover 125 and another of the projections 123 is a cover 126 having therein a slot 127. When the cover 126 is in place over one of the openings 124 only the matter on the printing line is visible through the slot 127. Farther along in this specification an outline of a system will be given in which these covers are used to advantage.

The shaft 120 (Fig. 7) has secured thereon a pair of adjustable tension collars 128, each having therein a hole into which is inserted one end of a pair of springs 129. The other end of each spring 129 is inserted in a hole in each of a pair of tension arms 130. The arms 130 each have secured thereto a hub 131 by means of which said arms are pivoted on the shaft 120. The hubs 131 are each partly cut away on their face to form a step, which is adapted to cooperate with like steps cut in adjustable release collars 132 secured to the shaft 120 for a purpose to be later described. Pivoted between the arms 130 is a compression roll shaft 133 having pivoted thereon a plurality of compression rolls 134 held in position by clips 139. A release arm 135 secured to the right end of the shaft 120 carries a stud 136 which is adapted to cooperate with a cam slot 137 in a release lever 138 pivoted on the rod 48.

The shaft 121 is similar to the shaft 120 and carries two tension arms 140 each having a stepped hub 141, two tension collars 142, two tension springs 143, and two stepped release collars 144. The arms 140, hubs 141, collars 142, springs 143 and collars 144 are identical with the arms 130, hubs 131, collars 128, springs 129 and collars 132 respectively, and therefore only one of each of the former elements is shown in Fig. 7. The arms 140 support a shaft 145 carrying tension rolls 146 held in place by clips 139. Also secured to the right end of the shaft 121 is a release arm 150 carrying a stud 151 adapted to cooperate with a cam slot 152 in the release lever 138.

The steps on the hubs 131 and 141 and the steps on the collars 132 and 144 are cut off center to allow the arms 130 and 140 to be moved independently of the collars 132, to the end that when the release lever 138 is in the position shown in Figs. 7 and 8, the rolls 134 and 146 under tension of the springs 129 and 143 will be urged toward the platen roll 44, thereby firmly holding the slip inserted between said rolls and platen so that feeding of said slip will be effected by rotating the platen roll.

When removing a slip from the chute or when placing a new slip within the chute it becomes necessary to move the rolls 134 and 146 away from the platen. This is accomplished by moving the lever 138 clockwise, which causes the cam slots 137 and 152 to coact with the studs 136 and 151 to rock the arm 135 and shaft 120 clockwise, and the arm 150 and shaft 121 counter-clockwise. This causes the steps on the collars 132 and 144 to engage the steps on the hubs 131 and 141 to rock the rolls 134 and 146 away from the platen roll 44. The shaft 75 extends through and is supported by the plates 113 and 114. The tension arms 140 have clearance holes therein, so that the shaft 75 may pass through them without interference.

Tally roll mechanism

A novel tally roll mechanism has been designed for use on the traveling carriage of the well-known Ellis type accounting machine. This tally roll may be used in conjunction with either the card chute or slip chute previously described herein, or if desired, it may be used alone. There are also numerous other ways in which such a tally roll may be used to advantage. A detailed description of the tally roll mechanism follows.

Figure 14:
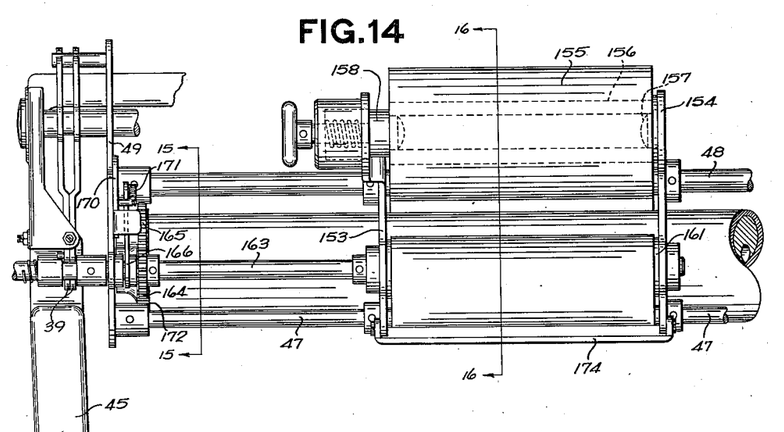
Fig. 14 is a view of the tally roll mechanism as observed from above.
Figures 15, 16:
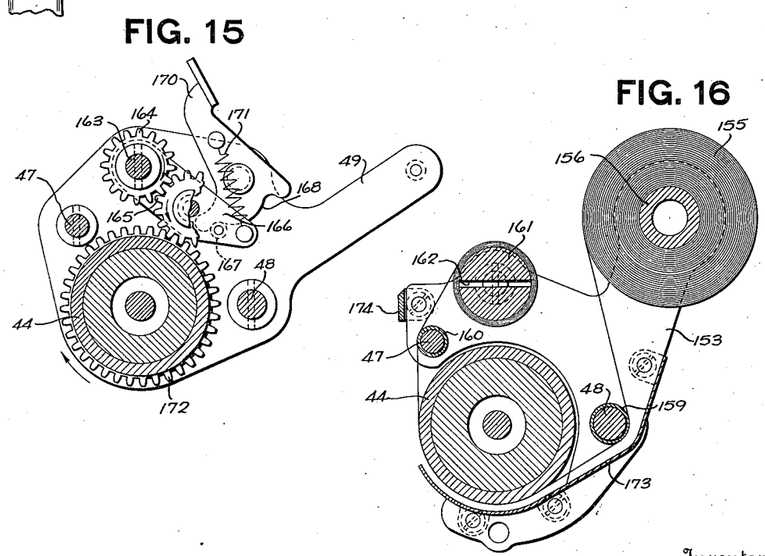
Fig. 15 is a section taken along line 15—15 of Fig. 14 looking in the direction of the arrows, and shows the tally roll driving mechanism.
Fig. 16 is a sectional view of the tally roll mechanism as viewed from the right, taken on line 16—16 of Fig. 14.

Referring to Figs. 14, 15 and 16, a pair of main plates 153 and 154 are secured to and supported by the rods 47 and 48. A supply roll 155 having a wood core 156 is rotatably mounted between the plates 153 and 154. A shouldered stud 157 secured in the plate 154 engages a hole in the core 156 to support the right-hand end of the roll 155. The plate 153 carries a spring plunger 158 which supports the left end of the roll 155, and likewise supplies means for removing and installing supply rolls. The plunger 158 also serves as a tension device to prevent the roll 155 from running ahead of the tally roll feeding mechanism, to be hereinafter described.

The paper from the supply roll 155 is first threaded about a roller 159 (Fig. 16) carried by the rod 48, then around the platen roll 44. From the platen 44 the paper passes over a roller 160 carried by the rod 47, and is then attached to a receiving roll 161 by being threaded through a slot 162 cut therein. The receiving roll 161 is journaled between the plates 153 and 154.

Secured to the left end of the receiving roll is a shaft 163 (Fig. 14) having its left end journaled in the carriage end-plate 49. A pinion 164 (Fig. 15) fast to the shaft 163 meshes with an intermediate pinion 165 mounted on an arm 166 pivoted on the shaft 163. A stud 167 secured in the arm 166 is adapted to cooperate with a cam surface 168 on an "On-and-Off" lever 170 pivoted on the plate 49. A spring 171 stretched between the plate 166 and the lever 170 is tensioned to hold the stud 167 against the cam surface 168, and also to retain the lever 170 in either its "on" or "off" position. Secured to the left end of the platen roll 44 is a gear 172 adapted to cooperate with the pinion 165.

With the lever 170 in the position shown in Fig. 15, the pinion 165 is meshed with the gear 172. The clockwise movement of the platen roll 44 caused by either the automatic or hand-feeding mechanism, through the pinions 164 and 165, revolve the receiving roll 161 (Fig. 16) in a clockwise direction, causing the tally paper to be wound thereon. As both the automatic and hand methods for revolving the platen roll have been fully described in earlier Ellis patents previously mentioned, it is thought unnecessary to again explain this mechanism at this time.

A guide plate 173 extending between the plates 153 and 154 (Fig. 16) is formed around the guide roller 159 and platen roll 44 to facilitate the threading of tally paper around the platen roll.

Often it is desirable that a portion of the tally paper used in certain transactions be preserved as a matter of record or reference, and to that end a tally paper knife 174 (Figs. 14 and 16) has been conveniently located in relation to the receiving roll 161 for the purpose of severing the above mentioned portions when desired. The knife 174 is secured between the plates 153 and 154.

Modified form of card receptacle or chute

Figure 17:
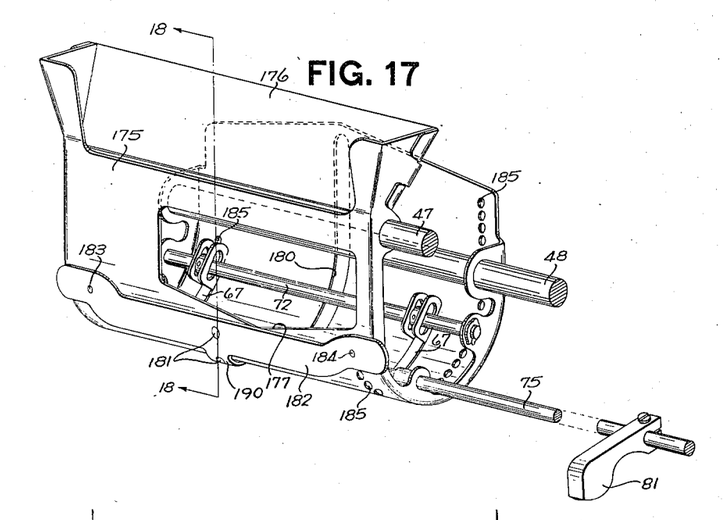
Fig. 17 is a perspective view of a modified form of card chute.
Figure 18:
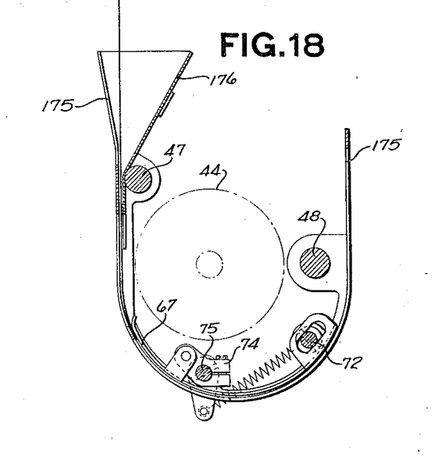
Fig. 18 is a sectional view along line 18—18 of Fig. 17, looking towards the left with certain parts omitted, and shows a modified card chute and the card retaining mechanism.
Figure 19:
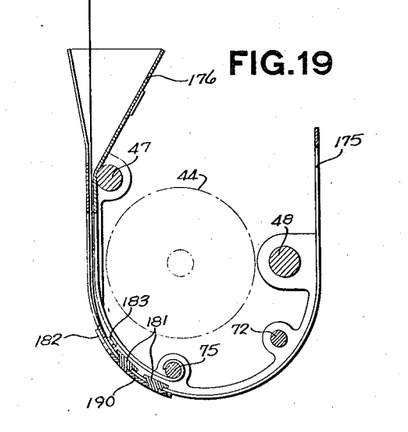
Fig. 19 is a sectional view taken along line 18—18 of Fig. 17, with certain parts omitted, and shows the adjustable card stop mechanism.

A modified form of card receptacle or chute 20 is well illustrated in Figs. 17, 18 and 19. This card chute is similar in many respects to the preferred form of card chute described earlier in this specification. Especially is this true regarding the means for securing or holding material inserted in said card chute and the means for automatically releasing the securing means. However, in the modified form of hand means for releasing the securing means is not shown, but if desired, may be incorporated therein.

The modified form of card chute (Fig. 17) composed of a main plate 175 and an auxiliary plate 176, formed around the platen roll 44, is supported by the rods 47 and 48. The receiving end of the card chute is flared to facilitate the insertion of cards therein. The plate 175 has an opening 177 through which the printing type makes contact with a card inserted in the card chute. Where the modified form of card chute differs materially from the preferred form, is in the stop mechanism for locating cards in proper relation to the printing type. This stop mechanism will now be explained.

The card chute plate 175 has near its center a slot 180 through which extends a pair of headed studs 181 (Figs. 17 and 19) fast in an extension 190 of a stop bar 182. The stop bar 182 extends the width of the card chute plate 175, the extreme ends thereof protruding beyond the card chute so that said bar may be easily grasped when it is desired to change the location of the stop mechanism. Secured in opposite ends of the stop bar 182 is a pair of stop studs 183 and 184 adapted to cooperate with a series of equally spaced holes 185 carried by the plate 175. The holes 185 are arranged in two parallel rows running lengthwise of the plate 175. The studs 183 and 184 are of such length that they protrude within the chute and form a stop for locating cards inserted within said chute.

When it is desired to change the location of the stop studs the operator grasps the two protruding ends of the stop bar 182, springing them outward until the stop studs 183 and 184 are disengaged from the holes 185 and clear of the chute plate 175. The stop bar may then be moved, guided by the slot 180 and studs 181 until the stop studs 183 and 184 are located over the desired set of holes. Releasing the ends of the bar 182 causes the stop studs 183 and 184 to be properly positioned by entering the selected set of holes 185.

Statement of operation

As an example of operation let us take the case of a telephone company in a large city having a great number of subscribers. The system used by this company requires that its subscribers pay a flat rate for a certain number of calls, say 75, and 5 cents per call for all over 75 calls. Each subscriber's phone has a register or step-by-step counter located at the central office or exchange, which accumulates 1 each time the subscriber makes a call. These registers each have an identification number, which is generally the same as that of the telephone they represent.

In the system used by this particular company, a permanent record is kept of each subscriber's account upon a "Ledger Card" 186 (Figs. 1 and 9). This ledger card is divided into spaces representing twenty-four monthly periods, and contains the name of the central office, the telephone or register number of the subscriber, and the minimum number of calls allowed by his contract without extra charge. The monthly calculation of each subscriber's account takes place upon a "Work Sheet" 187 (Figs. 1 and 10), which is arranged to take care of the monthly statements of 100 subscribers who are listed numerically by telephone or register number in a column headed "Telephone or Register Number".

At a fixed time each month a reading is taken of the telephone registers by photographing them in blocks of 100. Prints of these photographs are turned over to the machine operators for the purpose of copying the register readings upon the "Work Sheet", which is accomplished thus:

The operator releases the slip chute compression rolls 134 and 146 (Fig. 1) by moving the lever 138 clockwise. The "Work Sheet" representing the register numbers 3800 to 3899 is then inserted in the slip chute, adjusted until the line bearing the first register number is in line with the printing type, and then clamped in position by releasing the lever 138. The operator then raises the cover 125, which previously obscured the column headed "Present Reading", and copies therein the register readings taken from the photographic print of the registers 3800 to 3899 inclusive. The machine is arranged to automatically feed the "Work Sheet" in the usual manner, from line to line near the end of each operation.

After having copied all the register readings, the operator in a clearing operation prints the total thereof at the foot of the "Present Reading" column. The cover 125 is then closed, the cover 126 raised, the "Work Sheet" returned to the starting position, and the traveling carriage tabulated until the column headed "Proof Reading" is in horizontal alinement with the printing type. In this column the operator again copies the register readings from the photographic print and takes a total thereof, the same as before. This total is compared with the previous total for the purpose of detecting errors in the copying of the register reading.

Next the operator places the "Ledger Cards" 186 for the register numbers 3800 to 3899 in the holder 111 in sequential order. The card for the register number 3800 is placed in the card chute 43, the stop mechanism adjusted so that the proper monthly space, which let us assume in this case is August, is in horizontal alinement with the printing type. The "Work Sheet" is then adjusted so that the line bearing the register number 3800 is also alined horizontally with the printing type. The vertical platen feed is arranged to operate only when the traveling carriage is returned to the starting position after the computation of each account. The operator then proceeds with the computation of that particular account.

When finished with one account the "Work Sheet" is automatically fed upward to the next line bearing the register number 3801. The "Ledger Card" for 3800 is placed in the receptacle 112 and the "Ledger Card" for 3801 is inserted in the card chute 43, and so on until the "Ledger Card" for register No. 3809 is reached and a calculation of that account begun, a sequence of which will now be given.

The traveling carriage is tabulated until the column headed "Register Reading" on the "Ledger Card" is in printing position. The present register reading of 655 for the number 3809 for the month of August, found on the "Work Sheet" is read by the operator, set up on the keyboard, and such amount is then added into the totalizer and simultaneously printed upon the "Ledger Card" in the "Register Reading" column. The carriage is then tabulated to a column on the "Work Sheet" under the title of "Previous Reading", and here the previous monthly reading of 560, found on the "Ledger Card" is subtracted from the present reading of 655 and simultaneously printed upon the "Work Sheet". The carriage is next tabulated to a "Gross Usage" column on the "Work Sheet", where in a sub-total operation the difference between the present and previous monthly readings (95) is printed upon the "Work Sheet".

Since the minimum calls allowed by this contract has been exceeded, it is necessary for the operator in a non-print operation to subtract the minimum number 75 from the gross usage of 95. The carriage is then returned to a column on the "Ledger Card" headed "Gross or Additional Calls", and in a totalizing operation the difference between 75 and 95 (20) is printed upon the "Ledger Card". The cost of the additional calls, which in this case is one dollar, is obtained from a chart and entered by hand in an "Amount Column" on the "Ledger Card".

When the minimum number of calls (75) allowed by this contract has not been exceeded, this fact will be manifest to the operator when the gross number of calls is printed in the "Gross Usage" column on the "Work Sheet". In such case it is unnecessary to make the final subtracting operation in order to learn and print the number of calls made above the minimum, but instead the traveling carriage is immediately returned to the "Gross or Additional Calls" column on the "Ledger Card", and in a clearing or totalizing operation the gross number of calls is printed upon said "Ledger Card".

It can easily be seen how the tally roll mechanism explained earlier herein could be substituted for the slip chute mechanism used in the system outlined above, or in any similar case. It is also possible to use the modified form of card chute in any instance where the preferred form can be used.

The column headed "Reg. No." on the Ledger Card is used only when it is necessary to remove the subscriber's regular register in the central office for repairs or other reasons, at which time a substitute register is used bearing a different number. In such event the operator writes the substitute register number in the "Reg. No." column.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the character described, the combination of printing means; card receiving means; locating means adjustable relatively to the card receiving means, for locating material inserted in said card receiving means in proper relation to the printing means; gear means for adjusting the locating means; pinion means for rotating the gear means; and means cooperating with the gear means for locking the locating means in selected position.

2. In a machine of the class described, the combination of printing means; a card receptacle; gear means carried by the card receptacle; stop means carried by the gear means; manually operable means for rotating the gear means to vary the location of the stop means relatively to the receptacle, to control the position of card material in relation to the printing means; and means cooperating with the gear means for securing the stop means in selected position.

3. In a calculating machine, the combination of printing means; card receiving means; adjustable means having a plurality of spaces cut therein and stops secured thereto for selectively locating card matter in the card receiving means relative to the printing means; and means cooperating with the spaces in the adjustable means to maintain the stops in selected position.

4. In a calculating machine, the combination of printing means; card receiving means for presenting card material to the printing means; ring-shaped means; a plurality of rollers carried by the card receiving means and adapted to cooperate with the inner surface of the ring-shaped means to rotatably support said means on the card receiving means; locating means secured to the outer surface of the ring-shaped means and extending within the card receiving means for locating material inserted in said card receiving means in proper relation to the printing means; means for rotating the ring-shaped means to a selected position; and means for securing said ring-shaped means in selected position.

5. In a machine of the class described, the combination of printing means; a card receptacle for presenting card material to the printing means; a rotatable device; a plurality of means carried by the card receptacle and adapted to cooperate with the inner surface of the said rotatable device to support the same; locating means secured to the outer surface of said device and extending within the card receptacle to properly locate card material inserted in said card receptacle; a plurality of teeth on the outer surface of said device; pinion means cooperating with the teeth for selectively positioning the locating means; and means cooperating with the teeth of said device to secure the latter in selected position.

6. In a machine of the class described having printing means and a traveling carriage with a platen roll mounted thereon; the combination of a card receptacle on the traveling carriage and partially encircling the platen roll and adapted to receive cards to be printed upon; a plurality of ring gears encircling the platen; a member connecting the ring gears; a plurality of stop studs on said member adapted to extend within the card chute to locate the card means; a plurality of members carried by the card receptacle which cooperate with the inner surfaces of the ring gears to rotatably support said gears; manually operable means cooperating with the ring gears for varying the location of the stop studs to present any desired portion of the card to the printing means; and means cooperating with one of the ring gears for maintaining the stop studs in desired locations.

7. In a machine of the class described having printing means and a traveling carriage with a platen roll mounted thereon, the combination of a card chute mounted on the traveling carriage and partially encircling the platen roll to receive and hold a card relatively to the platen roll and the printing means; a member adjacent each end of the card chute; a plurality of rolls carried by each member; a device rotatably supported by the rolls on each member, each of said devices having a plurality of teeth; a bar connecting said devices, a plurality of stop members carried by the bar and adapted to extend within the chute; means cooperating with the teeth of said devices for varying the location of the stop members to present any desired portion of the card to the printing means; and means cooperating with the teeth of one of said devices for securing the stop members in selected locations.

8. In a calculating machine having printing means and a traveling carriage carrying a platen roll, the combination of a card chute on the traveling carriage adapted to interpose a card between the platen roll and printing means; means for securing the card inserted within the card chute, said securing means being ineffective when the machine is idle and the traveling carriage is in predetermined positions; and automatic means for rendering the securing means effective during operation of the machine.

9. In a machine of the class described having printing means and a traveling carriage carrying a platen roll; the combination of a card chute carried by the traveling carriage adapted to locate card material in proper relation to the printing means and platen roll; means for securing card material within the card chute; means for disabling the securing means when the traveling carriage is tabulated to predetermined positions; automatic means for making the securing means effective during machine operations when the traveling carriage is in such predetermined positions; and manual means for disabling the securing means at will.

10. In a machine of the class described having printing means and a traveling carriage carrying a platen roll; the combination of a card receptacle on the traveling carriage adapted to locate card material in proper relation to the printing means and platen roll; a plurality of tension members for securing card material within the card receptacle; releasing means for the tension members; mechanism cooperating with the releasing means when the traveling carriage is in predetermined positions to release the tension members; and means for reciprocating said mechanism to make the tension members effective during machine operations.

11. In an accounting machine of the character described having printing means and a traveling carriage carrying a platen roll, the combination of a card chute on the traveling carriage adapted to locate card material in proper relation to the printing means and platen roll; a plurality of tension members for securing cards within the chute; means for releasing the tension members; a main operating means; and means intermediate the main operating means and the releasing means for rendering the tension members ineffective when the traveling carriage is in predetermined positions, said intermediate means likewise causing the tension members to be effective during machine operations.

12. In a machine of the class described having printing means and a traveling carriage carrying a platen roll; the combination of a card chute on the traveling carriage adapted to locate card material in proper relation to the printing means and platen roll; pivoted tension members for securing cards within the chute; a device for rocking the tension members; a main operating means; and means intermediate the main operating means and said device for causing the tension members to be effective only during machine operation when the traveling carriage is tabulated to particular positions.

13. In a machine of the class described having a traveling carriage, a platen roll carried by said traveling carriage and printing means; the combination of a card chute on the traveling carriage having therein two rows of equally spaced holes; a spring member adapted to slide around the outside surface of the card chute; two projections, one for each row of holes, carried by the spring member, said projections adapted to pass through said holes and project within the card chute to form a stop for locating a predetermined space on multi-spaced card material in proper relation to the printing means.

14. In a machine of the class described, the combination of printing means; card receiving means; locating means adjustable relatively to the card receiving means, to locate material inserted in said card receiving means in proper relation to the printing means; an adjustable device for adjusting the locating means, said device being provided with teeth; a pinion meshing with said teeth for adjusting the device; and means cooperating with the adjustable device for locking the locating means in selected position.

15. In a machine of the class described, the combination of printing means; a card receptacle; an adjustable device carried by the card receptacle; stop means carried by the adjustable device; manually operable means for adjusting the device to vary the location of the stop means relatively to the receptacle to control the position of card material in relation to the printing means; and means cooperating with the adjustable device for securing the stop means in selected position.

16. In a calculating machine, the combination of printing means; card receiving means; adjustable means having a plurality of spaces cut therein and a stop secured thereto for selectively locating card matter in the card receiving means relative to the printing means; and means cooperating with the spaces in the adjustable means to maintain the stop in selected position.

RAYMOND A. CHRISTIAN.